(12) United States Patent
Ogawa et al.

(10) Patent No.: US 11,150,472 B2
(45) Date of Patent: Oct. 19, 2021

(54) DISPLAY SYSTEM, VISIBILITY EVALUATION METHOD, AND METHOD OF DETERMINING SIZE OF VISUAL TARGET

(71) Applicants: DENSO CORPORATION, Kariya (JP); The Kitasato Institute, Tokyo (JP)

(72) Inventors: Hiroaki Ogawa, Kariya (JP); Takeshi Enya, Kariya (JP); Takushi Kawamorita, Sagamihara (JP)

(73) Assignees: DENSO CORPORATION, Kariya (JP); THE KITASATO INSTITUTE, Tokyo (JP)

( * ) Notice: Subject to any disclaimer, the term of this patent is extended or adjusted under 35 U.S.C. 154(b) by 0 days.

(21) Appl. No.: 16/869,254

(22) Filed: May 7, 2020

(65) Prior Publication Data
US 2020/0355917 A1   Nov. 12, 2020

(30) Foreign Application Priority Data

May 7, 2019   (JP) .............................. JP2019-087558

(51) Int. Cl.
*G02B 27/01*   (2006.01)
(52) U.S. Cl.
CPC .... *G02B 27/0101* (2013.01); *G02B 2027/014* (2013.01); *G02B 2027/0116* (2013.01); *G02B 2027/0118* (2013.01); *G02B 2027/0138* (2013.01)
(58) Field of Classification Search
CPC .. G02B 27/0101; G02B 27/017; G02B 27/01; G02B 2027/0178; G02B 2027/0118; G02B 2027/014; G02B 2027/0112; G02B 2027/0138; G06F 3/013; G06F 3/011;
(Continued)

(56) References Cited

U.S. PATENT DOCUMENTS

2003/0174866 A1* 9/2003 Poynter .................... G09G 5/06
382/114
2009/0243819 A1* 10/2009 Paia ....................... B60K 35/00
340/425.5

(Continued)

FOREIGN PATENT DOCUMENTS

JP         2004-351943 A      12/2004

*Primary Examiner* — Xuemei Zheng
(74) *Attorney, Agent, or Firm* — Maschoff Brennan

(57) ABSTRACT

The display system includes a first storage unit storing standardized data composed chromaticity values and luminance values. An information acquirer acquires luminance values and chromaticity values of a visual target and luminance and chromaticity values of a background thereof. A standardization unit standardizes the chromaticity values and the luminance values of the visual target and the background based on these chromaticity values and the luminance values of the visual target and the background thereof and the standardized data stored in the first storage unit. A visual target contrast calculator calculates a contrast of a visual target to a background by measuring a distance in a color space between the visual target and the background each defined by the standardized luminance and chromaticity values. A second storage unit stores an expression defining a relation between the contrast thereof to the background and a size of the visual target.

7 Claims, 8 Drawing Sheets

| COMBINATION DATA | SIZE OF VISUAL TARGET | VISUAL TARGET CONTRAST |
|---|---|---|
| (D1, D2) | X12 | I12 |
| (D1, D3) | X13 | I13 |
| (D1, D4) | X14 | I14 |
| (D1, D5) | X15 | I15 |
| (D1, D6) | X16 | I16 |
| (D1, D7) | X17 | I17 |
| (D1, D8) | X18 | I18 |
| (D1, D9) | X19 | I19 |
| (D1, D10) | X110 | I110 |

(58) Field of Classification Search
CPC .. G06F 1/163; G06F 2320/066; G06F 40/103; G06T 19/006; G06T 19/20
See application file for complete search history.

(56) References Cited

U.S. PATENT DOCUMENTS

2018/0190019 A1* 7/2018 Glynn .................... G06T 11/60
2018/0335633 A1   11/2018 Naruse

* cited by examiner

FIG.3

| STANDARDIZED DATA | LUMINANCE | CHROMATICITY |
|---|---|---|
| D1 | L1 | C1 |
| D2 | L2 | C2 |
| D3 | L3 | C3 |
| D4 | L4 | C4 |
| D5 | L5 | C5 |
| D6 | L6 | C6 |
| D7 | L7 | C7 |
| D8 | L8 | C8 |
| D9 | L9 | C9 |
| D10 | L10 | C10 |

FIG.4

| COMBINATION DATA | SIZE OF VISUAL TARGET | VISUAL TARGET CONTRAST |
|---|---|---|
| (D1, D2) | X12 | I12 |
| (D1, D3) | X13 | I13 |
| (D1, D4) | X14 | I14 |
| (D1, D5) | X15 | I15 |
| (D1, D6) | X16 | I16 |
| (D1, D7) | X17 | I17 |
| (D1, D8) | X18 | I18 |
| (D1, D9) | X19 | I19 |
| (D1, D10) | X110 | I110 |

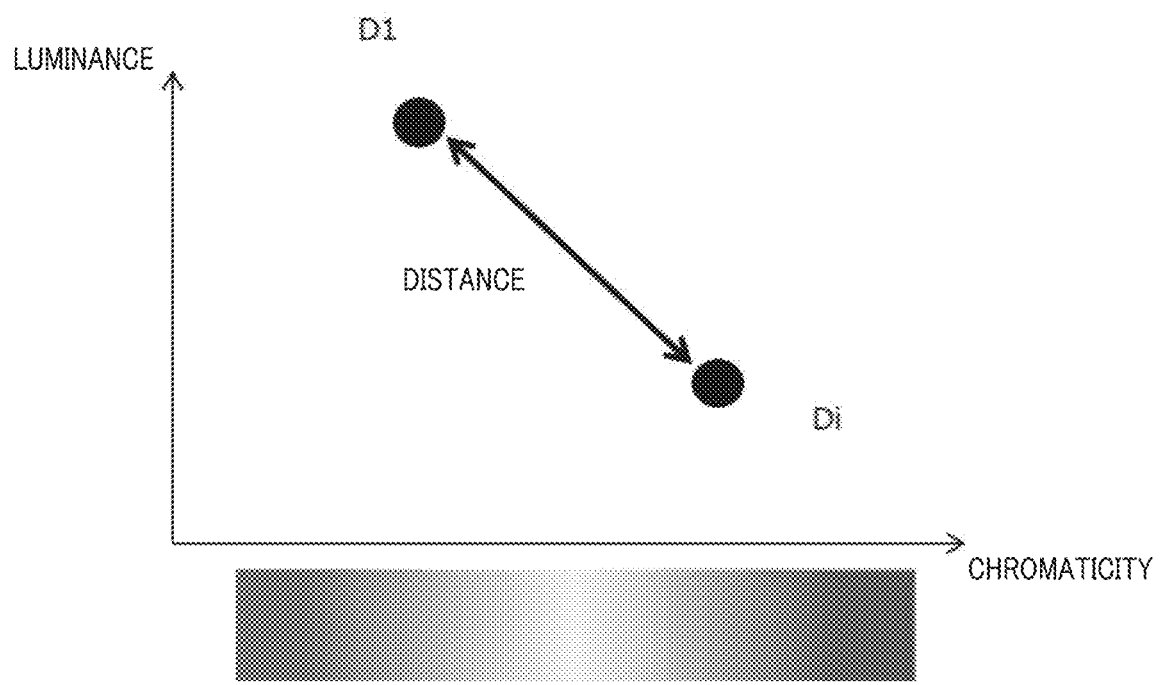

DISPLAY SYSTEM, VISIBILITY EVALUATION METHOD, AND METHOD OF DETERMINING SIZE OF VISUAL TARGET

CROSS-REFERENCE TO RELATED APPLICATION

This patent application is based on and claims priority to Japanese Patent Application No. 2019-087558, filed on May 7, 2019 in the Japan Patent Office, the entire disclosure of which is hereby incorporated by reference herein.

BACKGROUND

Technical Field

The present disclosure relates to a display system, a visibility evaluation method and a method of determining a size of a visual target.

Related Art

Conventionally, a head-up display (hereinafter referred to as a HUD) is known. The HUD can display a visual target such as characters, etc. A landscape around a vehicle is also displayed by the HUD as a background of the visual target.

SUMMARY

Accordingly, the present disclosure provides a display system, a visibility evaluation method and a method of determining a size of the visual target capable of calculating a visibility indication representing the visibility of the visual target.

Hence, one aspect of the present disclosure provides a novel display system for displaying a visual target. That is, the novel display system includes a first storage unit to store standardized data composed of chromaticity values and luminance values and an information acquirer to acquire luminance values and chromaticity values of the visual target and a luminance value and a chromaticity value of a background of the visual target. The display system also includes a standardization unit to standardize the chromaticity values and the luminance values of the visual target and the background of the visual target acquired by the information acquirer based on the standardized data stored in the first storage unit and the chromaticity values and the luminance values of the visual target and the background of the visual target acquired by the information acquirer. The display system also includes a visual target contrast calculator to calculate a contrast of a visual target to a background by measuring a distance in a color space between the visual target defined by the standardized luminance and chromaticity values and the background defined by the standardized luminance and chromaticity values. The display system also includes a second storage unit to store an expression defining a relation between a contrast of a visual target to a background and a size of a visual target and a size determiner to determine a size of the visual target by substituting the contrast of the visual target to the background, calculated by the visual target contrast calculator into the expression.

Hence, according to one aspect of the present disclosure, the display system can calculate the contrast of the visual target to the background, that represents the visibility of the visual target. Further, the display system of one aspect of the present disclosure can determine and use the size of the visual target in accordance with the contrast of the visual target to the background. Accordingly, even when one of the chromaticity values and the luminance values of the visual target varies, the display system of one aspect of the present disclosure can ensure the visibility of the visual target.

Another aspect of the present disclosure provides a novel visibility evaluation method that includes the steps of: acquiring multiple luminance values and chromaticity values of a visibility evaluation target and luminance and chromaticity values of a background of the visibility evaluation target; and standardizing the acquired luminance values and chromaticity values of the visibility evaluation target and the background thereof based on the acquired luminance values and chromaticity values of the visibility evaluation target and the background thereof and previously standardized and stored luminance values and chromaticity values. The novel visibility evaluation method further includes the step of calculating a distance in a color space between the visibility evaluation target defined by the standardized luminance and chromaticity values and the background thereof defined by the standardized luminance and chromaticity values.

Thus, according to another aspect of the present disclosure, the visibility evaluation method can calculate the contrast of the visual target to the background, representing the visibility of the visual target.

Yet another aspect of the present disclosure provides a novel size determination method for determining a size of a visual target to be displayed in a display system. The size determination method includes the steps of: acquiring multiple luminance values and chromaticity values of a visibility evaluation target and luminance and chromaticity values of a background of the visibility evaluation target; and standardizing the acquired luminance values and chromaticity values of the evaluation target and the background thereof based on the acquired luminance values and chromaticity values of the evaluation target and the background thereof and previously standardized and stored luminance values and chromaticity values. The size determination method further includes the steps of: calculating a contrast of a visual target to a background by measuring a distance in a color space between the visibility evaluation target defined by the standardized luminance and chromaticity values and the background thereof defined by the standardized luminance and chromaticity values; and determining a size of the visual target by substituting the contrast of the visual target to the background, calculated in the step of calculating the distance into an expression defining a relation between the size of the visual target and the contrast of the visual target to the background.

Thus, according to this aspect of the present disclosure, the size determination method can calculate the contrast of the visual target to the background, representing the visibility of the visual target. Further, the size determination method of this aspect of the present disclosure can determine the size of the visual target in accordance with the contrast of the visual target to the background. Thus, even when one of the chromaticity values and the luminance values of the visual target varies, the size determination method of this aspect of the present disclosure can ensure the visibility of the visual target.

Yet another aspect of the present disclosure provides a novel display system for displaying a visual target. The display system includes an information acquirer to acquire background information indicating at least one of a luminance value and a chromaticity value of a background of the visual target and a display size determiner to determine a size of the visual target based on evaluation of visibility of the visual target relative to the background. The evaluation of visibility is performed based on a standard display size of the visual target and the background information.

Hence, according to yet another aspect of the present disclosure, the display system can determine a final display size of displaying the visual target based on the standard display size of displaying the visual target and background information. Thus, according to this aspect of the present disclosure, even when the background information varies, the display system can ensure the visibility of the visual target.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein:

FIG. 3 is a table showing details of data stored in a storage unit according to one embodiment of the present disclosure;

FIG. 4 is another table showing details of data stored in the storage unit according to one embodiment of the present disclosure;

FIG. 9 is a drawing illustrating a color space having a coordinate system based on luminance and chromaticity according to one embodiment of the present disclosure.

DETAILED DESCRIPTION

Figure 1:
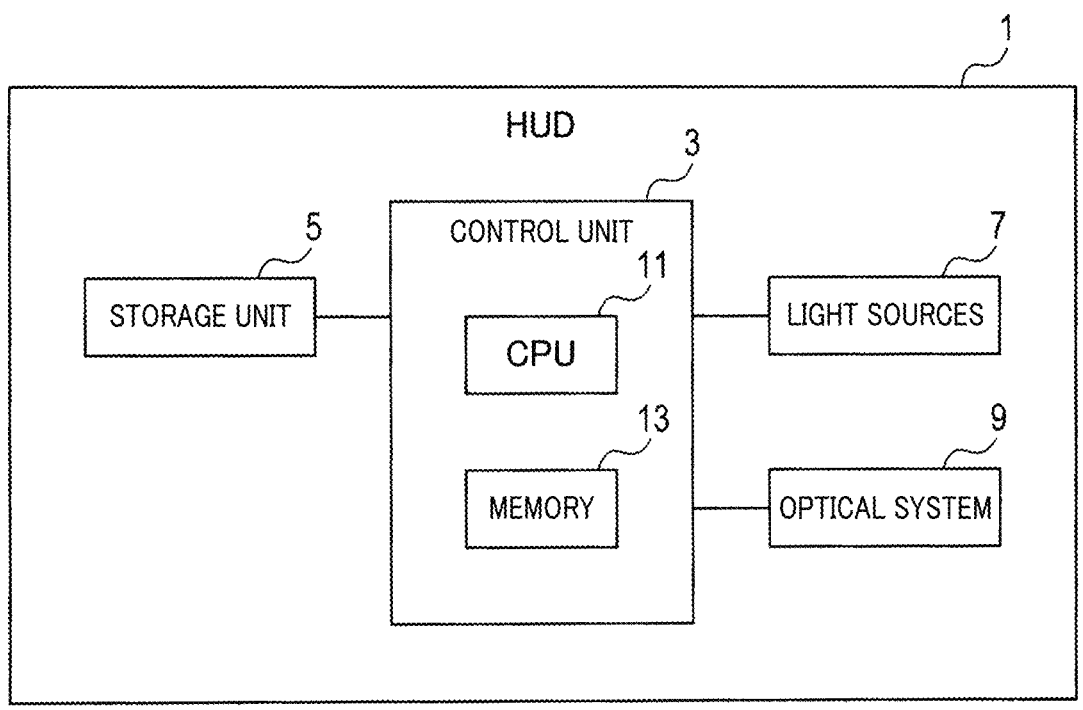
FIG. 1 is a block diagram illustrating a configuration of a HUD according to one embodiment of the present disclosure.

As described earlier, the head-up display is known, for example, as discussed in Japanese Patent Application Laid Open No. 2017-097759 (JP-2017-097759-A). However, visibility of a visual target varies in accordance with a luminance value or a chromaticity value of one of a visual target and a background. To ensure the visibility of the visual target, a size of display of the visual target may be appropriately adjusted in accordance with either the luminance value or the chromaticity value of any one of the visual target and the background as a possible countermeasure.

To appropriately adjust the size of the display of the visual target, it is necessary to calculate a contrast of a visual target to a background (i.e., a visibility indication), indicating visibility of the visual target.

Referring now to the drawings, wherein like reference numerals designate identical or corresponding parts throughout the several views thereof, and to FIGS. 1 to 5, a configuration of the HUD 1 is herein below described, initially.

Figure 5:
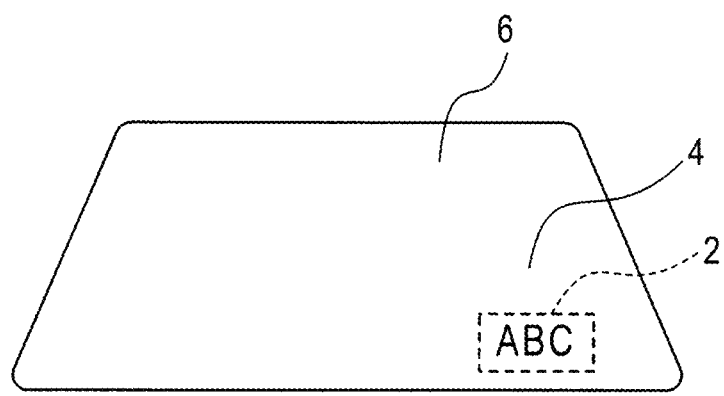
FIG. 5 is a diagram illustrating a visual target and a background viewed from a viewpoint located in a passenger compartment according to one embodiment of the present disclosure.

Specifically, in a present disclosure, the HUD 1 corresponds to a display system. The HUD 1 is mounted on a vehicle, for example. Like a known HUD, the HUD 1 of the present disclosure can display a visual target 2 as shown in FIG. 5. The visual target 2 is displayed by the HUD 1 to be viewed by a driver driving the vehicle.

Further, there is a background 4 around the visual target 2. The background 4 is, for example, a portion appearing in a front landscape around the visual target 2 viewed from a viewpoint of a driver driving the vehicle through a windshield 6. The visual target 2 includes, for example, characters and figures or the like. The characters include signs, such as arrows, circles, crosses, etc.

Further, as shown in FIG. 1, the HUD 1 includes a control unit 3, a storage unit 5, and multiple light sources 7. The HUD 1 also includes an optical system 9. The control unit 3 is composed of a microcomputer having, for example, a CPU (Central Processing Unit) 11 and a semiconductor memory, such as a RAM (Random Access Memory), a ROM (Read Only Memory), etc., (hereinafter referred to as a memory 13).

Further, various functions may be performed by the control unit 3 when the CPU 11 runs program stored in a non-transitory tangible recording medium. In this example, the memory 13 corresponds to a non-transitory computer readable tangible medium that stores the program. Hence, by running the program, a method is executed corresponding to the program. The control unit 3 may be configured by either a single microcomputer or multiple microcomputers.

Figure 2:
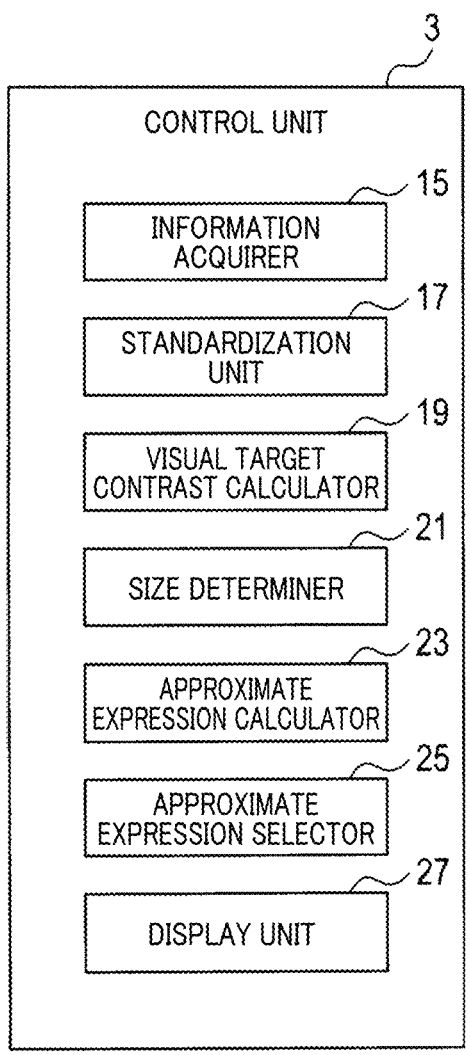
FIG. 2 is a block diagram illustrating a functional configuration of a control unit according to one embodiment of the present disclosure.

Further, as shown in FIG. 2, the control unit 3 includes an information acquirer 15, a standardization unit 17 and a visual target contrast calculator 19.

Further, in the storage unit 5, various standardized data D1 to D10 shown FIG. 3 are stored. A standardized data Di includes a luminance value Li and a chromaticity value Ci. A suffix i attached to each of the standardized data, the luminance value L and the chromaticity value C is a natural number of from 1 to 10. The chromaticity value Ci is defined in a chromaticity diagram drawn by a CIE (International Commission on Illumination) 1976 UCS (Uniform Chromaticity Scale). Hence, the storage unit 5 corresponds to first and second storage units in the present disclosure.

Hence, the standardized data D1 includes a luminance value L1 and a chromaticity value C1 obtained from a background 4 (e.g., a road on which a vehicle is running). The standardized data of from D2 to D10, respectively, include luminance values of from L2 to L10 and chromaticity values of from C2 to C10 obtained from the visual target 2.

The chromaticity values of from C2 to C10 respectively correspond to white, red, orange, yellow, yellow-green, green, blue-green and blue or the like, and are different from each other. Further, in the storage unit 5, multiple combination data shown in FIG. 4 are stored. Specifically, each of the combination data includes two different standardized data of D1 and Dj, wherein the suffix j attached to standardized data D is a natural number of from 2 to 10. That is, each of the combination data may be composed of standardized data D1 and Dj, and is herein below collectively referred to as standardized combination data (D1, Dj).

Further, as shown in FIG. 4, in the storage unit 5, a size X1j of the visual target 2 is stored in association with combination data (D1, Dj). The size of the visual target 2 is a size of the visual target 2 displayed by the HUD 1. Further, the size X1j of the visual target 2 may be determined based on a result of a visibility test in accordance with a visual target contrast I1j described later in more detail. Here, the size X1j corresponds to a standard display size of displaying the visual target 2.

Hence, either a subjective optimum size (i.e., an optimum size determined based on a subjective judgment) or a minimum readable size is determined by varying a size of a character included in the visual target 2 while fixing the visual target contrast I1j. The subjective optimum size is a size of the character most easily read by an examinee (i.e., a driver). The minimum readable size is a size of the smallest character in a range that the examinee can read the character. Hence, when the subjective optimum size or the minimum readable size is represented by X1j, the smaller the visual target contrast I1j, the larger the subjective optimum size or the minimum readable size X1j.

Further, as shown in FIG. 4, various visual target contrast values I1j are stored in the storage unit 5 in association with combination data (D1, Dj), respectively. Here, each of the visual target contrast data I1j is calculated as follows. First, each of the luminance values L1 to L10 is standardized to obtain a standardized luminance value LSi as a part of standardized data Di. Specifically, the LSi is calculated by the below described first expression. As shown, a standardized luminance value included in the data Di is represented by LSi.

$$LSi=(Li-Lm)/L\sigma \quad \text{(First Expression)}$$

In the first expression, an element $L\sigma$ is a standard deviation of each of lamination values of from L1 to L10 and an element Lm is an average value of the lamination values of from L1 to L10.

Subsequently, each of chromaticity values of from C1 to C10 is standardized. A standardized chromaticity value included in standardized data Di is represented by CSi, and is calculated by the below described second expression.

$$CSi=(Ci-Cm)/C\sigma \quad \text{(Second Expression)}$$

In the second expression, an element $C\sigma$ is a standard deviation of each of chromaticity values of from C1 to C10, and an element Cm is an average value of the chromaticity values of from C1 to C10.

Hence, a standardized luminance value in the standardized data D1 standardized by the first expression is herein below referred to as LS1, and a standardized chromaticity value included in data D1 standardized by the second expression is herein below referred to as CS1. Further, a standardized luminance value included in standardized data Dj standardized by the first expression is herein below referred to as LSj. Also, a standardized chromaticity value included in data Dj standardized by the second expression is herein below referred to as CSj.

Here, the standardized data D1 having the standardized luminance value LS1 and the standardized chromaticity value CS1 is defined by a point on a color space. Similarly, the standardized data Dj having the standardized luminance value LSj and the standardized chromaticity value CSj is defined by a point on the color space. Further, a distance in the color space between the standardized data D1 and the standardized data Dj is hereinbelow referred to as a visual target contrast I1j.

Further, in the storage unit 5, the below described third expression is also stored.

$$X=F(I) \quad \text{(Third Expression)}$$

The third expression is an approximate expression in that a size X approaches a size X1j of a visual target when a visual target contrast I1j is substituted for an element I. That is, the third expression is calculated based on the size X1j of a visual target and the visual target contrast I1j each stored in the storage unit 5 using regression analysis. Hence, the third expression corresponds to an expression defining a relation between a visual target contrast $I\alpha$ [alpha] and a size of a visual target 2 as described later more in detail.

Further, in the storage unit 5, data $R^2$ representing a matching rate at which a size X1j of a visual target and a visual target contrast I1j meets the third expression is stored, wherein the data $R^2$ is herein below referred to as a determination coefficient. Further, multiple light sources 7 and an optical system 9 are provided to display the visual target 2. Each of the light sources 7 has a different color from the others. The visual target 2 is displayed by mixing colors of the multiple light sources 7.

Figure 6:
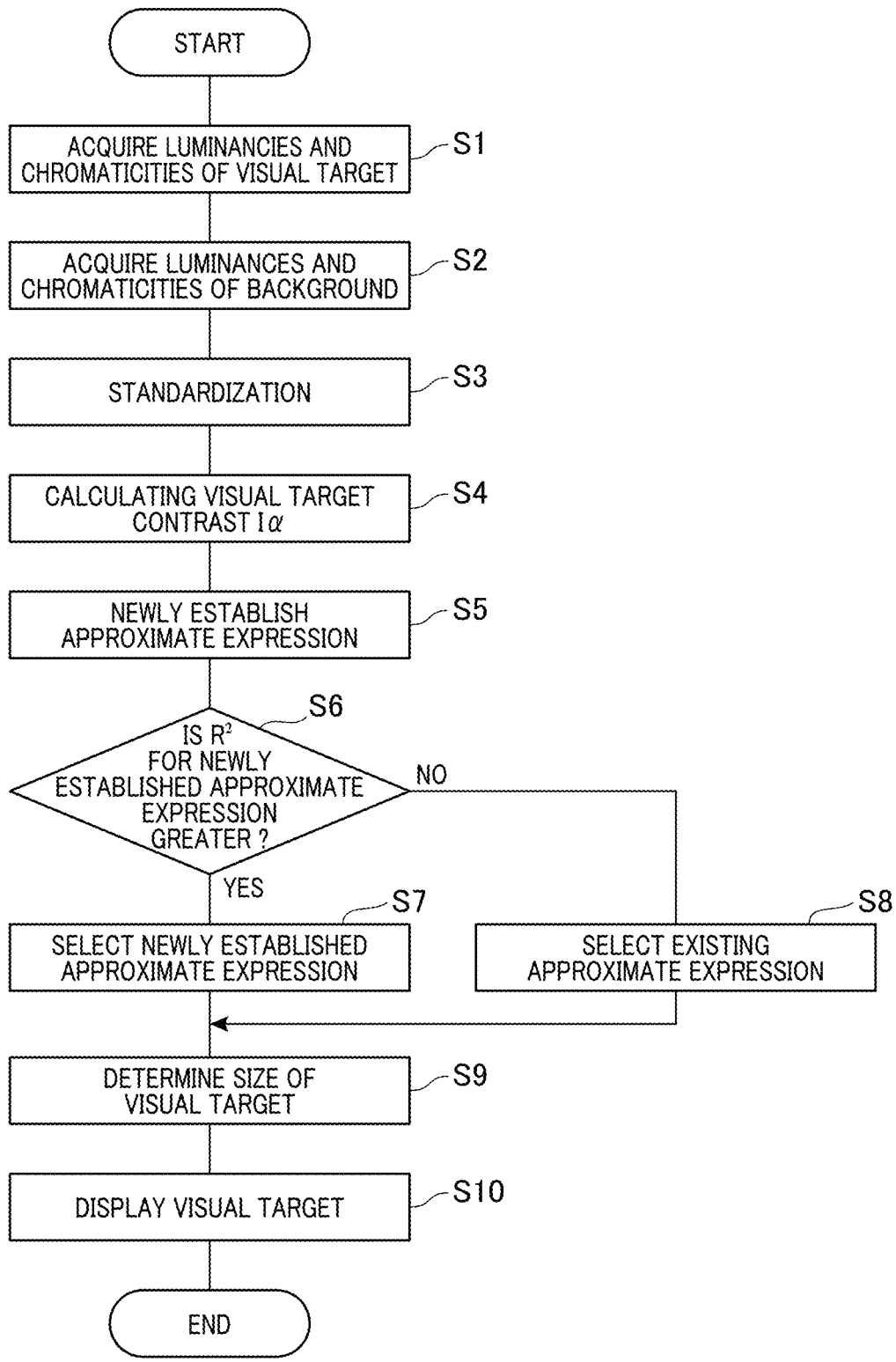
FIG. 6 is a flowchart illustrating processing performed by the HUD according to one embodiment of the present disclosure.

Now, a process executed repeatedly by the HUD 1 at every given interval will be described with reference to FIG. 6. In step 1 of FIG. 6, the information acquirer 15 acquires information of luminance values and chromaticity values of a visual target 2. Here, the HUD 1 determines the chromaticity values and the luminance values of the visual target 2 by using any suitable technique. Hence, the information acquirer 15 acquires the chromaticity values and the luminance values determined by the HUD 1 in this way. Herein below, the luminance value of the visual target 2 as acquired by the information acquirer 15 is referred to as a luminance value L11. Also, the chromaticity value of the visual target 2 as acquired by the information acquirer 15 is referred to as a chromaticity value C11.

In step 2, the information acquirer 15 acquires the luminance value L1 and the chromaticity value C1 by reading them from the storage unit 5. As described earlier, the luminance value L1 corresponds to a luminance value of the background 4 of the visual target 2. The chromaticity value C1 corresponds to a chromaticity value of the background 4 of the visual target 2. That is, the luminance value L1 and the chromaticity value C1 collectively correspond to background information.

Further, in step 3, the standardization unit 17 standardizes the luminance value L1 to L11 using the below described fourth expression, wherein k is a natural number of from 1 to 11, $L\sigma$ is a standard deviation of each of luminance values of from L1 to L11, and Lm is an average value of the luminance values of from L1 to L11. Here, these luminance values of from L1 to L10 are luminance data stored in the storage unit 5. Further, as described earlier, the luminance value L11 is the luminance value obtained in step 1.

$$LS'k=(Lk-Lm)/L\sigma \quad \text{(Fourth Expression)}$$

Further, the standardization unit 17 standardizes chromaticity values of from C1 to C11 using the below described fifth expression, wherein k is a natural number of from 1 to 11, $C\sigma$ is a standard deviation of each of chromaticity values of from C1 to C11 and Cm is an average value of the chromaticity values of from C1 to C11. Here, the chromaticity values of from C1 to C10 are chroma data stored in the storage unit 5. Further, as described earlier, the chromaticity value C11 is the chroma acquired in step 1.

$$CS'k=(Ck-Cm)/C\sigma \quad \text{(Fifth Expression)}$$

Further, in step 4, the visual target contrast calculator 19 calculates a visual target contrast $I\alpha$ (alpha) between the visual target 2 and the background 4 in the below described manner. That is, values LS'11, CS'11, LS'1 and CS'1 have been calculated as a result of standardization performed in step 3, wherein the value LS'11 is a standardized luminance value of the visual target 2, the value CS'11 is a standardized chromaticity value of the visual target 2, and the value LS'1 is a standardized luminance value included in data D1 of the background. Also, the value CS'1 is a standardized chromaticity value included in data D1.

Here, the standardized visual target 2 is defined by a point on a color space having the standardized luminance value LS'11 and the standardized chromaticity value CS'11. Similarly, the standardized data D1 is defined by a point on a color space having the standardized luminance value LS'1 and the standardized chromaticity value CS'1. Here, a distance in the color space between the standardized visual target 2 and the standardized data D1 (e.g., as illustrated in FIG. 9) is herein below referred to as a visual target contrast Iα (alpha) between the visual target 2 and the background 4. Hence, calculation of the visual target contrast Iα [alpha] corresponds to evaluation of visibility of the visual target 2 relative to the background 4.

Further, in step 5, the approximate expression calculator 23 establishes a new approximate expression in the below described manner. That is, the chromaticity values and the luminance values of respective data from D1 to D10 have been standardized in step 3. Hence, the approximate expression calculator 23 again calculates a visual target contrast I1$j$ using the chromaticity values and the luminance values of respective data of from D1 to D10 having been standardized in step 3.

Further, the visual target contrast I1$j$ (hereinafter referred to as a reestablished visual target contrast I1$j$) recalculated in this way is represented by a distance in a color space between the standardized data D1 as standardized in step 3 and the standardized data D$j$ as standardized in the same step 3.

Then, the approximate expression calculator 23 establishes the below described new approximate expression as a sixth expression.

$$X=G(I) \quad \text{(Sixth Expression)}$$

Here, the sixth expression is an approximate expression established Such that when the recalculated visual target contrast Ij is substituted for the element I, the size X approaches a size X1$j$ of the visual target. Specifically, the sixth expression is established based on regression analysis by using the recalculated visual target contrast Ij and the size X1$j$ of the visual target stored in the storage unit 5. Hence, the sixth expression corresponds to an expression defining a relation between the visual target contrast α (alpha) and the size of the visual target 2 in the present disclosure.

Further, the approximate expression calculator 23 calculates an approximate expression establishing rate $R^2$ (i.e., the determination coefficient) at which the recalculated visual target contrast Ij and size X1$j$ of the visual target collectively meet the sixth expression.

$$X=G(I) \quad \text{(Seventh Expression)}$$

Specifically, in step 6, the approximate expression selector 25 determines if the determination coefficient $R^2$ meeting the sixth expression is greater than the determination coefficient $R^2$ meeting the third expression. If the determination coefficient $R^2$ meeting the sixth expression is greater than the determination coefficient $R^2$ meeting the third expression, the process proceeds to step 7. By contrast, if the determination coefficient $R^2$ of the sixth expression is the determination coefficient $R^2$ of the third expression or less, the process proceeds to step 8.

Specifically, in step 7, the approximate expression selector 25 selects the sixth expression as an approximate expression to be used in step 9 described later in detail. By contrast, in step 8, the approximate expression selector 25 selects the third expression as an approximate expression to be used in step 9 described later in detail.

Further, in step 9, the size determiner 21 substitutes the visual target contrast α (alpha) calculated in step 4 in the approximate expression selected in either step 7 or step 8, thereby determining the size of the visual target 2. Hence, the size of the visual target 2 determined in this way corresponds to a final display size of the visual target 2.

Figure 7:
FIG. 7 is a graph illustrating a relation between a contrast of a visual target to a background and each of a subjective optimum size and a minimum readable size at night according to one embodiment of the present disclosure.
Figure 8:
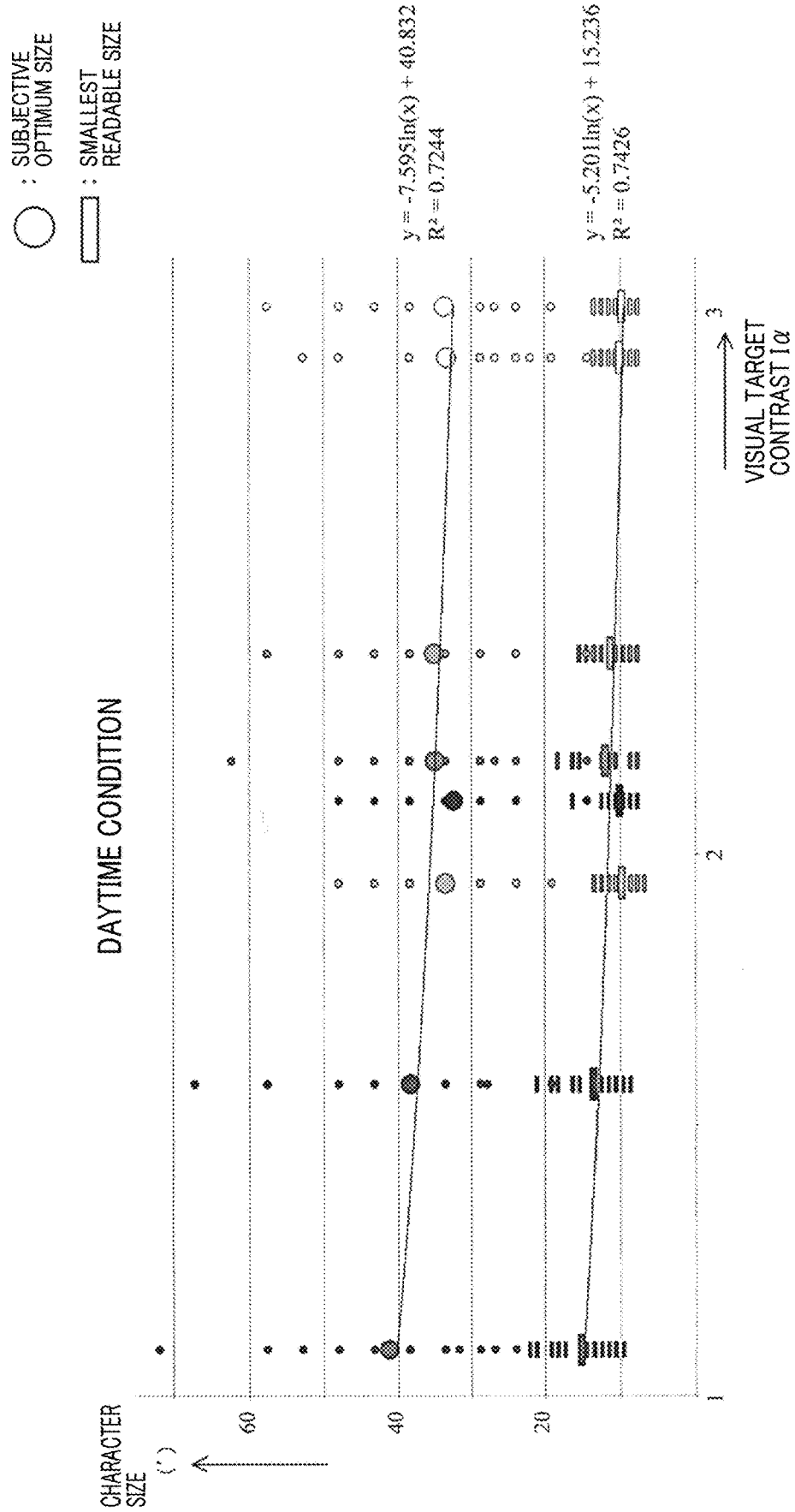
FIG. 8 is a graph illustrating a relation between a contrast of a visual target to a background and each of a subjective optimum size and a minimum readable size in the daytime according to one embodiment of the present disclosure.

Subsequently, in step 10, the display unit 27 displays the visual target with the size determined in this way in step 9. Herein below, various advantages obtained by the above-described HUD 1 are described. First, the HUD 1 can calculate the visual target contrast α (alpha) representing the visibility of the visual target 2. That is, it has been confirmed by the below described visibility test that the visual target contrast α (alpha) represents the visibility of the visual target 2, wherein given values corresponding to a background at night are assigned to a luminance value L1 and a chromaticity value C1, respectively. Specifically, in FIG. 7, a horizontal axis indicates a visual target contrast α (alpha), and multiple visual target contrasts α (alpha) are indicated.

In each of the visual target contrasts α (alpha), a size of a character contained in the visual target 2 is varied. Then, in each of the visual target contrasts α (alpha), a subjective optimum size and a minimum readable size are determined. Here, each of the subjective optimum size and the minimum readable size is an average value of values measured by 19 testers.

Subsequently, based on the subjective optimum size determined in this way, an approximate expression defining a relation between the visual target contrast α (alpha) and the subjective optimum size is established. According to the approximate expression, the determination coefficient R2 is 0.8154 and is relatively large. Similarly, based on the minimum readable size determined in this way, an approximate expression defining a relation between the visual target contrast α (alpha) and the minimum readable size is established. According to the approximate expression, a value $R^2$ is 0.8028 and is relatively large. Hence, from these tests, it is confirmed that the visual target contrast α (alpha) represents the visibility of the visual target 2.

Subsequently, based on the subjective optimum size determined in this way, an approximate expression defining a relation between the visual target contrast α (alpha) and the subjective optimum size is established. According to the approximate expression, the determination coefficient $R^2$ is 0.8154 and is relatively large. Similarly, based on the minimum readable size determined in this way, an approximate expression defining a relation between the visual target contrast α (alpha) and the minimum readable size is established. According to the approximate expression, a value $R^2$ is 0.8028 and is relatively large. Hence, from these tests, it is confirmed that the visual target contrast α (alpha) represents the visibility of the visual target 2.

Secondly, the HUD 1 can designate a size of a visual target 2 in accordance with a visual target contrast α (alpha). For example, the smaller the absolute value of the visual target contrast α (alpha), the larger the visual target 2. Thus, even when either a luminance value or a chromaticity value of the visual target 2 varies, the HUD 1 can ensure the visibility of the visual target 2.

Thirdly, the HUD 1 can more appropriately determine the size of the visual target 2 in accordance with the visibility of the visual target 2. That is, the HUD 1 newly establishes the approximate expression of the sixth expression based on standardized luminance values LS'1 and LS'j and standardized chromaticity values CS'1 and CS'j of standardized data D1 and Dj constituting the combination data (D1, Dj). The HUD 1 establishes the approximate expression also based on sizes X1j of the visual target 2 associated with the combination data (D1, Dj).

Then, the HUD 1 selects one of the approximate expressions causing the determination coefficient $R^2$ to be larger between the sixth expression and the third expression as an existing approximate expression. The HUD 1 then determines a size of the visual target 2 based on the selected approximate expression. Hence, the HUD 1 can more appropriately determine the size of the visual target 2 in accordance with the visibility of the visual target 2.

Now, various modifications of the above-described embodiment of the present disclosure are herein below described. First, the HUD 1 can measure a luminance value and a chromaticity value of the background 4. The HUD 1 can then update the luminance value L1 and the chromaticity value C1 based on the luminance value and the chromaticity value of the background 4 as measured. Further, the HUD 1 can update a size X1j of the visual target stored in the storage unit 5 based on the luminance value L1 and the chromaticity value C1 as updated. Hence, the measured luminance value and the chromaticity value collectively correspond to the background information in the present disclosure. However, the background information can be composed only one of the chromaticity value and the luminance value.

Secondly, the HUD 1 can omit processing of the steps 5 and 6. In such a situation, the HUD 1 can always use the third expression as the approximate expression in step 9. Thirdly, another display system can be utilized in place of the HUD 1. For example, a liquid crystal display, an organic EL display, a projector and the like can be exemplified as the display systems. Further, a visual target 2 and a background 4 can be displayed on the same display system as display objects.

Further, multiple functions exerted by a single component in the above-described embodiment can be realized by multiple components. Also, one function with one component exerted by a single component in the above-described embodiment can be realized by multiple components. Further, multiple functions exerted by multiple components can be realized by one component. Also, one function realized by multiple components can be realized by one component. Further, a portion of the configuration employed in the above-described embodiment can be omitted. Further, at least a portion of the configuration of the above-described embodiment can be added to or substituted for a configuration of the other embodiment described above.

Further, the above-described various control devices 3 and the methods can be performed by a dedicated computer composed of a processor programed by computer program to perform one or more functions specified by the computer program and a memory storing various data. Otherwise, the above-described various control devices 3 and the methods can be performed by a dedicated computer including a processor composed of at least one dedicated hardware logical circuits. Alternatively, the above-described various control devices 3 and the methods can be performed by one or more dedicated computers each prepared by combining a processor programed by computer program to perform one or more functions, a memory storing various data, and another processor composed of one or more hardware logical circuits. Further, the computer program can be stored in a computer readable non-transitory tangible recording medium as an instruction to be performed by the computer.

Hence, as described heretofore, one embodiment of the present disclosure provides a novel display system for displaying a visual target. The display system includes a first storage unit storing standardized data composed chromaticity values and luminance values respectively associated with the chromaticity values and an information acquirer to acquire luminance values and chromaticity values of the visual target and a luminance value and a chromaticity value of a background of the visual target. The display system further includes a standardization unit configured to standardize the chromaticity values and the luminance values of the visual target and the background acquired by the information acquirer based on the chromaticity values and the luminance values of the visual target and the background of the visual target acquired by the information acquirer and the standardized data stored in the first storage unit. The display system further includes a visual target contrast calculator to calculate a distance representing a contrast of a visual target to a background, in a color space between the visual target and the background based on the standardized luminance value and the standardized chromaticity value of each of the visual target and the background. The display system further includes a second storage unit storing an expression defining a relation between the contrast of the visual target to the background and a size of the visual target and a size determiner to determine a size of the visual target by substituting the visual target contrast, calculated by the visual target contrast calculator in the expression.

Hence, according to one embodiment of the present disclosure, the display system can calculate the contrast of the visual target to the background, that represents the visibility of the visual target. Further, the display system of one embodiment of the present disclosure can determine and use the size of the visual target in accordance with the contrast of the visual target to the background. Accordingly, even when one of the chromaticity values and the luminance values of the visual target varies, the display system of one embodiment of the present disclosure can ensure the visibility of the visual target.

Another embodiment of the present disclosure provides a novel visibility evaluation method that includes the steps of: acquiring luminance values and chromaticity values of a visibility evaluation target and luminance and chromaticity values of a background of the visibility evaluation target; standardizing the luminance values and chromaticity values of the evaluation target and the luminance and chromaticity values of the background thereof based on data composed of standardized luminance values and chromaticity values; and calculating a distance in a color space between the evaluation target and the background thereof based on the standardized luminance values and the standardized chromaticity values of the evaluation target and the standardized luminance and chromaticity values of the background thereof.

Thus, according to another embodiment of the present disclosure, the visibility evaluation method can calculate the contrast of the visual target to the background, representing the visibility of the visual target.

Yet another embodiment of the present disclosure provides a novel size determination method for determining a size of a visual target to be displayed in a display system. The size determination method includes the steps of: acquiring luminance values and chromaticity values of a visibility evaluation target and a luminance value and a chromaticity value of a background of the visibility evaluation target;

standardizing the luminance values and the chromaticity values of the evaluation target and the luminance and chromaticity values of the background thereof based on data composed of standardized luminance values and standardized chromaticity values; and calculating a distance in a color space between the evaluation target and the background thereof based on the standardized luminance values and the standardized chromaticity values of the evaluation target and the background thereof. The size determination method includes the step of determining a size of the visual target by substituting the contrast of the visual target to the background, calculated by the visual target contrast calculator in an expression defining a relation between the size of the visual target and the contrast of the visual target to the background.

Thus, according to this embodiment of the present disclosure, the size determination method can calculate the contrast of the visual target to the background, representing the visibility of the visual target. Further, the size determination method of this embodiment of the present disclosure can determine the size of the visual target in accordance with the contrast of the visual target to the background. Thus, even when one of the chromaticity values and the luminance values of the visual target varies, the size determination method of this embodiment of the present disclosure can ensure the visibility of the visual target.

Yet another embodiment of the present disclosure provides a novel display system for displaying a visual target. The display system includes: an information acquirer configured to acquire one of a luminance value and a chromaticity value of a background of the visual target; and a display condition determiner configured to determine a final display condition by evaluating visibility of the visual target relative to the background based on both a standard display condition and background information.

Hence, according to yet another embodiment of the present disclosure, the display system can determine a final display size of displaying the visual target based on the standard display size of displaying the visual target and background information. Thus, according to this embodiment of the present disclosure, even when the background information varies, the display system can ensure the visibility of the visual target.

Numerous additional modifications and variations of the present disclosure are possible in light of the above teachings. It is accordingly to be understood that within the scope of the appended claims, the present disclosure may be executed otherwise than as specifically described herein. For example, the present disclosure is not limited to the above-described display system and may be altered as appropriate. Further, the present disclosure is not limited to the above-described visibility evaluation method and may be altered as appropriate. Further, the present disclosure is not limited to the above-described size determination method and may be altered as appropriate.

What is claimed is:

1. A display system for displaying a visual target overlapping with a background, the display system comprising:
    a first storage unit to store standardized data composed of chromaticity values and luminance values of a previous visual target and a chromaticity value and a luminance value of a previous background of the previous visual target;
    an information acquirer to acquire luminance values and chromaticity values of a new visual target and a luminance value and a chromaticity value of a new background of the new visual target;
    a standardization unit to newly standardize the chromaticity values and the luminance values of the new visual target and the new background of the new visual target acquired by the information acquirer based on the standardized data stored in the first storage unit and the chromaticity values and the luminance values of the new visual target and the new background of the new visual target acquired by the information acquirer;
    a visual target contrast calculator to calculate a contrast of the new visual target to the new background by measuring a distance in a color space between a point of the new visual target defined by newly standardized luminance and chromaticity values of the new visual target and a point of a background defined by the newly standardized luminance and chromaticity values of the new background,
    the color space being represented by a coordinate system having XY axes, the X-axis representing a chromaticity and the Y-axis representing a luminance:
    a second storage unit to store an expression defining a relation between a contrast of a visual target to a background and a size of a visual target; and
    a size determiner to determine a size of the new visual target by substituting the contrast of the new visual target to the new background, calculated by the visual target contrast calculator into the expression.

2. The display system as claimed in claim 1, wherein
    the standardization unit repeatedly standardizes luminance values and chromaticity values of a new visual target and a new background of the new visual target at given intervals,
    the first storage unit stores multiple combinations of the newly standardized luminance values and chromaticity values of the new visual target and the new background of the new visual target,
    each of the multiple combinations being stored in association with a corresponding size of the visual target, and
    the expression is a first approximate expression established based on multiple contrasts of the visual target to the background generated by the visual target contrast calculator multiple times at given intervals and multiple sizes of the visual target determined by the size determiner multiple times at given intervals corresponding to the contrasts, respectively.

3. The display system as claimed in claim 2, further comprising:
    an approximate expression calculator to establish a second approximate expression based on at least one of the multiple combinations of the newly standardized luminance values and chromaticity values of the new visual target and the new background of the new visual target and a size of the visual target corresponding to the at least one of multiple combinations of standardized data, and
    an approximate expression selector to select one of the first and second approximate expressions having a higher determination coefficient,
    the determination coefficient indicating a matching rate at which a size of a visual target and a contrast of the visual target to a background collectively meet corresponding one of the first and second approximate expressions,
    wherein the size determiner uses one of the first and second approximate expressions selected by the approximate expression selector to determine the size of the visual target.

4. The display system as claimed in claim 1, wherein the display system constitutes a head-up display.

5. A visibility evaluation method of evaluating a visibility of a visibility evaluation target displayed overlapping with a background, the method comprising the steps of:
   acquiring multiple luminance values and chromaticity values of a visibility evaluation target and luminance and chromaticity values of a background of the visibility evaluation target;
   standardizing the acquired luminance values and chromaticity values of the visibility evaluation target and the background thereof based on the acquired luminance values and chromaticity values of the visibility evaluation target and the background thereof and previously standardized and stored luminance values and chromaticity values of a previous visibility evaluation target and a previous background of the previous visibility evaluation target; and
   calculating a distance in a color space between a point defined by the standardized luminance and chromaticity values of the visibility evaluation target and a point defined by the standardized luminance and chromaticity values of the background thereof,
   the color space being represented by a coordinate system having XY axes, the
   X-axis representing a chromaticity and the Y-axis representing a luminance.

6. A size determination method for determining a size of a visual target displayed in a display system, comprising the steps of:
   acquiring respective luminance values and chromaticity values of a current visual target and luminance and chromaticity values of a current background of the current visual target;
   standardizing the currently acquired luminance values and chromaticity values of the current visual target and the current background thereof based on the currently acquired luminance values and chromaticity values of the current visual target and the current background thereof and previously standardized and stored luminance values and chromaticity values of a previous visual target and a previous background of the previous visual target;
   calculating a contrast of the current visual target to the current background by measuring a distance in a color space between a point defined by the standardized luminance and chromaticity values of the current visual target and a point defined by the standardized luminance and chromaticity values of the current background thereof; and
   determining a size of the current visual target by substituting the contrast of the current visual target to the background, calculated in the step of calculating the distance into an expression defining a relation between the size of the visual target and the contrast of the visual target to the background.

7. A head up display system for displaying a visual target on a display overlapping with a background of the visual target, comprising:
   an information acquirer to acquire background information indicating at least a chromaticity value of the background of the visual target; and
   a display size determiner to determine a size of the visual target based on evaluation of visibility of the visual target relative to the background, the evaluation of visibility being performed based on a standard display size of the visual target and the background information,
   wherein the background is a front landscape viewed through the display.

* * * * *